(12) United States Patent
Fortin

(10) Patent No.: US 6,664,477 B2
(45) Date of Patent: Dec. 16, 2003

(54) INSULATOR BAND, WIRING SYSTEM, AND KIT

(76) Inventor: Henry E. Fortin, 522 Rockingham St., Berlin, NH (US) 03570

( * ) Notice: Subject to any disclaimer, the term of this patent is extended or adjusted under 35 U.S.C. 154(b) by 0 days.

(21) Appl. No.: 09/899,680

(22) Filed: Jul. 5, 2001

(65) Prior Publication Data

US 2002/0074155 A1 Jun. 20, 2002

Related U.S. Application Data

(60) Provisional application No. 60/216,118, filed on Jul. 6, 2000.

(51) Int. Cl.[7] ................................................ H01B 7/00
(52) U.S. Cl. .................................... 174/138 F; 174/135
(58) Field of Search ........................... 174/135, 137 R, 174/138 R, 145, 149 R, 168, 176, 138 F

(56) References Cited

U.S. PATENT DOCUMENTS

| | | | | |
|---|---|---|---|---|
| 3,931,494 A | * | 1/1976 | Fisher et al. ................ | 219/386 |
| 4,733,430 A | * | 3/1988 | Westergren ................. | 116/268 |
| 4,967,815 A | * | 11/1990 | Sheu .......................... | 141/360 |
| 5,598,902 A | * | 2/1997 | Lin ............................. | 137/454.5 |
| 5,655,374 A | * | 8/1997 | Santilli et al. .............. | 2/905 |
| 5,933,575 A | * | 8/1999 | Sanders ...................... | 392/497 |
| 6,021,823 A | * | 2/2000 | Hale ........................... | 123/198 DC |

FOREIGN PATENT DOCUMENTS

GB    2253524 A   *   9/1992

* cited by examiner

Primary Examiner—Dean A. Reichard
Assistant Examiner—Jinhee J. Lee
(74) Attorney, Agent, or Firm—Michael J. Persson; Michael K. Blankenship; Lawson & Persson, P.C.

(57) ABSTRACT

An insulator band, electrical wiring system, and kit for preventing shorting of electrical connectors. The system and kit of the present invention each utilize an insulator band that is manufactured of an insulating material, dimensioned of sufficient width to cover the terminals of the switch or outlet, and sized to provide a sufficient elastic force upon the switch or outlet to maintain it in position, while preventing breakage or springing from the switch or outlet. In operation, the wires are extended through the band and are connected in the normal manner to the switch or outlet. The band is then slid back over the wires, stretched over the switch or outlet, and positioned to cover the terminals of the switch or outlet. The switch or outlet is than installed into the outlet box in the in the normal manner. When the switch or outlet needs to be removed or replaced, the band is slipped back off the wires and may be reused once a new outlet or switch is installed.

18 Claims, 4 Drawing Sheets

INSULATOR BAND, WIRING SYSTEM, AND KIT

CLAIM OF PRIORITY

This application claims the benefit of priority of U.S. Provisional Patent Application No. 60/216,118, filed on Jul. 6, 2000.

FIELD OF THE INVENTION

The present invention relates to the field of electrical wiring and, in particular, to an insulator band, electrical wiring system, and kit for preventing electrical shock and shorting.

BACKGROUND OF THE INVENTION

A common problem facing electricians in the installation of light switches, standard electrical outlets, and ground fault circuit interrupt (GFCI) outlets is the avoidance of shorting between the side terminals and/or wires and the metal outlet boxes. Typically, this problem is solved by wrapping electrical tape around the switch or outlet in order to keep the screws or wires from touching the outlet box and the ground wire from touching the live screws. However, the use of electrical tape has its drawbacks.

First, electrical tape is a single use product and may not be reused after it has been removed. Accordingly, an electrician or homeowner must remove and rewrap the switches or outlets each time they need to access the wires. Second, electrical tape is relatively expensive and, given the inability to reuse it, must be used in significant quantities in order to provide the required protection against short circuits. Third, electrical tape is prone to shrinkage and expansion due to changes in temperature. Such shrinkages and expansions may cause the tape to lose their adhesion with the outlets or switches and, over time, to work free of the area to be protected. Fourth, electrical tape is difficult to neatly wrap around the outlets and, thus, a finished installation using electrical tape does not usually have a neat, professional, look. Finally, the removal of electrical tape can leave a sticky film on the outlet or switch, and on the hands of the electrician or homeowner who is removing the tape.

One common method of avoiding short circuits between outlets and/or switches and the outlet box is to install plastic outlet boxes rather than metal. This solution is acceptable in many applications, but cannot be utilized in others. For example, the vast majority of existing installations use metal junction boxes that would be costly to replace. In addition, local electrical codes in many areas require the use of metal boxes in at least some classes of installation. Thus, the availability of plastic outlet boxes does not eliminate the problem solved by the present invention.

In order to solve this problem, the inventor first developed a boot that would cover the connection of the switch, outlet or GFCI. Such a boot would cover the back of the switch, outlet or GFCI and would include openings through which the wires could extend for connection to the power source. The booted switch, outlet or GFCI would then be installed into the wall outlet box. However, because such a boot would need be fairly large and include a separate back piece, the cost would be likely be greater than that of tape. Accordingly, the inventor sought different, less costly, solutions to the problem.

An apparatus for preventing shorting of the wires or terminals of electrical switches, outlets, and/or GFCI outlets with outlet boxes that may be removed and reused, is less expensive than electrical tape, will not shrink or expand significantly due to changes in temperature, produces a neat, professional looking, installation, does not leave a sticky film on the switch, outlet, or installer once it has been removed, and does not require a plastic junction box to be installed is not known in the art.

SUMMARY OF THE INVENTION

The present invention is an insulator band, electrical wiring system and kit that solve that problems identified above. The system and kit of the present invention each utilize an insulator band that is manufactured of an insulating material, dimensioned of sufficient width to cover the terminals of the switch or outlet, and sized to provide a sufficient elastic force upon the switch or outlet to maintain it in position, while preventing breakage or springing from the switch or outlet.

In operation, the wires are extended through the band and are connected in the normal manner to the switch or outlet. The band is then slid back over the wires, stretched over the switch or outlet, and positioned to cover the terminals of the switch or outlet. The switch or outlet is than installed into the outlet box in the in the normal manner. When the switch or outlet needs to be removed or replaced, the band is slipped back off the wires and may be reused once a new outlet or switch is installed.

In the preferred embodiment, the insulator band is manufactured of rubber, such as those utilized for bicycle inner tubes. Such a material is preferred due to its rot resistance, low cost and elastic properties. The preferred system includes the preferred insulting band attached to an electrical connector, such as a light switch, electrical outlet or GFCI outlet, which is mounted to a metal electrical outlet box. The preferred kit includes a desired electrical connector and at least one insulator band dimensioned for disposal about the connector.

Therefore it is an aspect of the invention to provide an apparatus, system and kit that will prevent electrical connectors from shorting.

It is a further aspect of the invention to provide an apparatus, system and kit that will protect installers from electrical shock.

It is a further aspect of the invention to provide an apparatus that may be removed and reused.

It is a further aspect of the invention to provide an apparatus that is less expensive than electrical tape.

It is a further aspect of the invention to provide an apparatus that will not shrink or expand significantly due to changes in temperature.

It is a further aspect of the invention to provide an apparatus that produces a neat, professional looking, installation.

It is a further aspect of the invention to provide an apparatus that does not leave a sticky film on the switch, outlet, or installer once it has been removed.

It is a still further aspect of the invention to provide a system and kit that does not require a plastic junction box to be installed.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
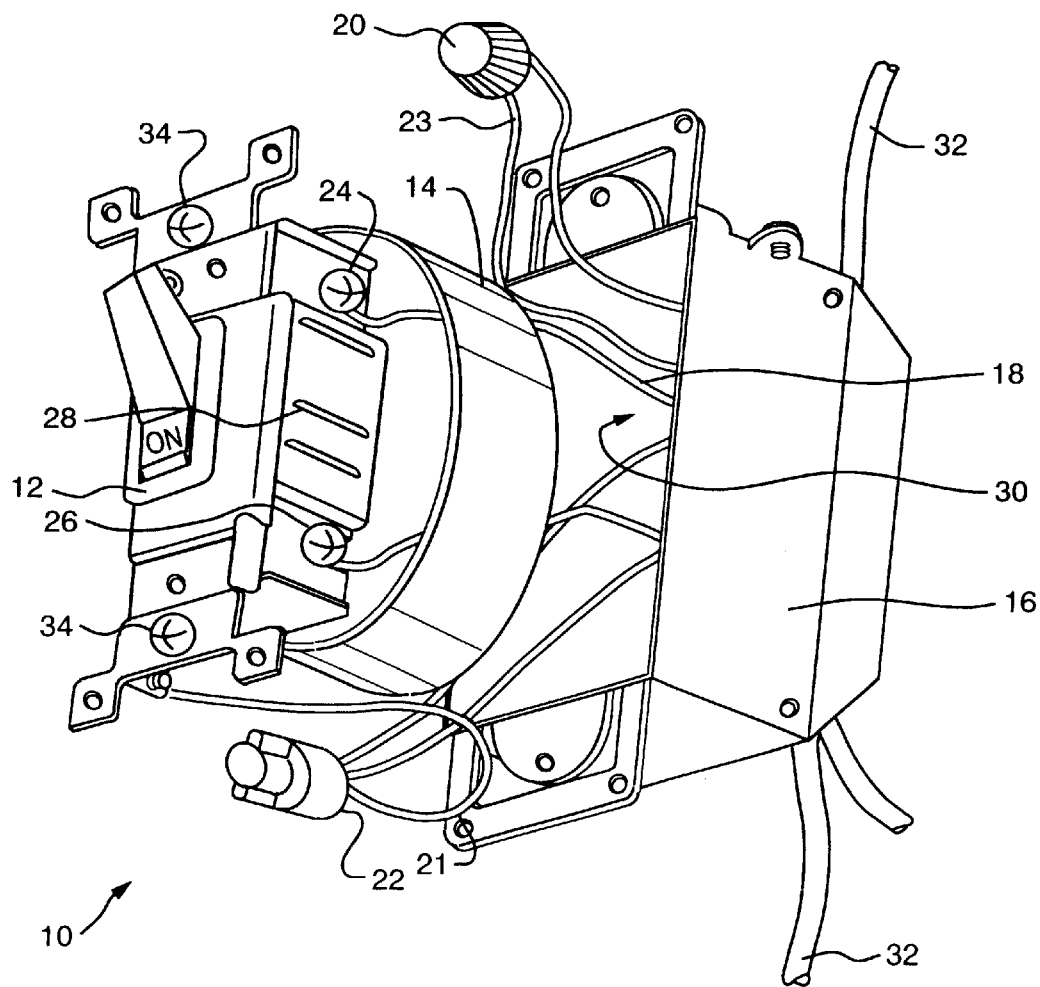
FIG. 1 is an isometric view of the preferred system of the present invention with the insulator band in position to be installed about an electrical switch and mounted within an outlet box.

Referring first to FIG. 1, the system 10 of the present invention includes an electrical connector 12, an insulator band 14 dimensioned for disposal over the electrical connector 12, and an outlet box 16 dimensioned to accept the electrical connector 12.

The electrical connector 12 includes a plurality of terminals 24, 26 along its sides 28. These terminals 24, 26 may be screw type terminals, as shown in FIG. 1, spring type terminals, or other art recognized terminal means for connecting electrical wires 18 to an electrical connector 12. As shown in FIG. 1, the electrical connector 12 is a switch, such as those commonly utilized for controlling electric lights. However, it is recognized that the system 10 may utilize other electrical connectors 12, such as dimmer switches, standard electrical outlets, GFCI type outlets, and the like.

The insulator band 14 is manufactured of an insulating material, such as natural or synthetic rubber, and is dimensioned of sufficient width to cover the terminals 24, 26 of the electrical connector 12 when installed over the sides 28 of the connector. In the preferred embodiment, the insulator band 14 is manufactured from the same materials utilized in the manufacture of bicycle inner tubes and is sized to provide a sufficient elastic force upon the electrical connector 12 in order to maintain it in position, while preventing breakage or springing from the electrical connector 12. However, it is recognized that insulator bands 14 of different materials may be utilized, so long as the materials provide sufficient insulation from electric shock, have sufficient elastic properties to hold the insulator band 14 around the electrical connector while preventing the insulator band 14 from springing or losing elasticity, and will not quickly degrade so as to create shorting problems during normal usage.

The outlet box 16 is a standard outlet box, such as those commonly available for use in the installation of electrical connectors 12. As shown in FIG. 1, the outlet box 16 includes an opening 30 that is dimensioned to allow a single light switch to be mounted therein. However, it is recognized that the outlet box 16 will vary depending upon the application in which it will be utilized. For example, an outlet box 16 having multiple openings 30 may be utilized to accommodate multiple electrical connectors 12. The outlet box 16 may be manufactured of any material commonly utilized in the field of electrical components. In the preferred embodiment, the outlet box 16 is manufactured of metal, such as steel, to provide proper grounding and to meet code requirements in the majority of applications. However, the shock prevention benefits of the insulator band 14 make the present invention equally applicable for use with plastic outlet boxes 16.

Figure 2:
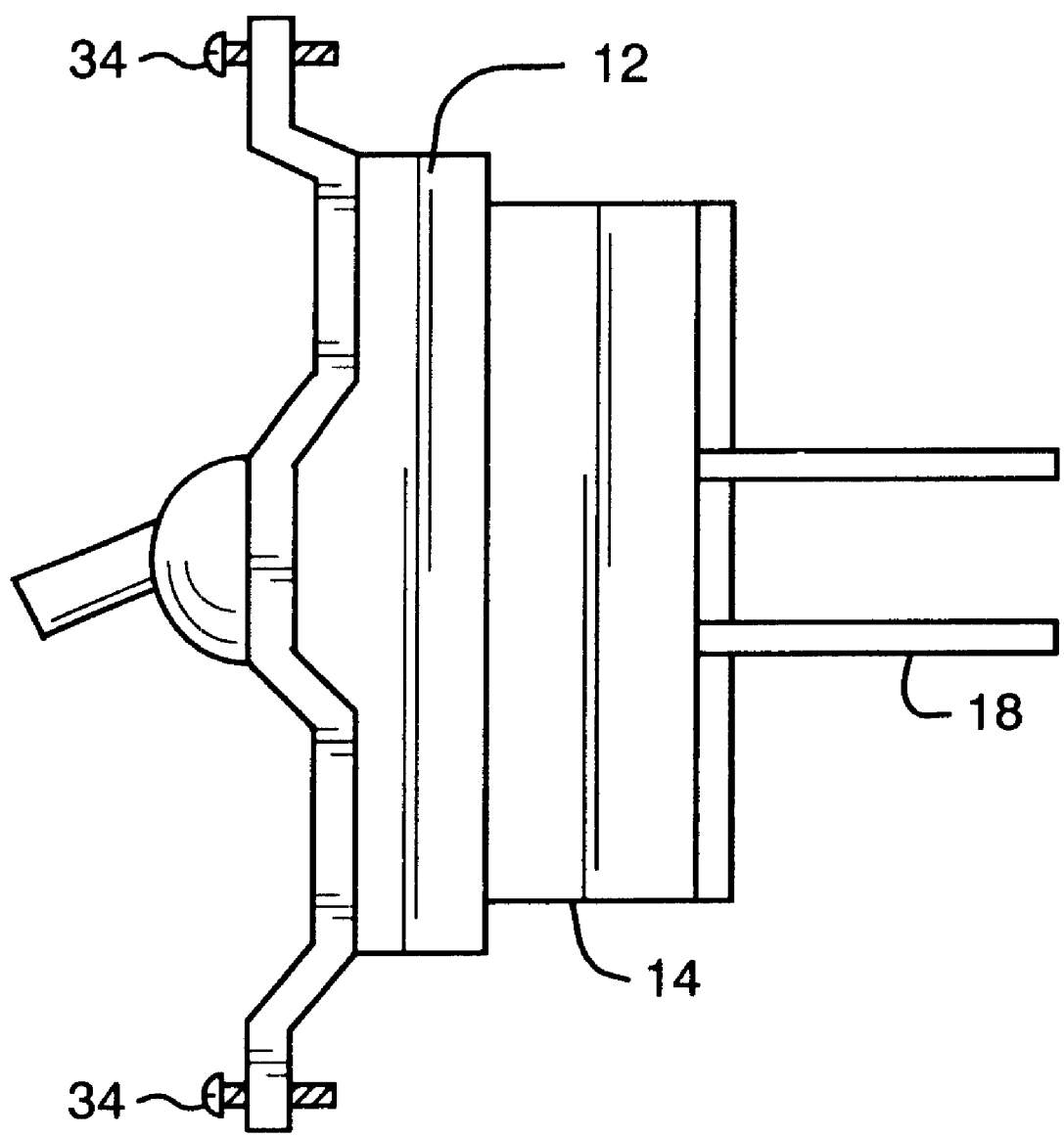
FIG. 2 is a side view of the insulator band of the present invention mounted about the electrical switch of FIG. 1.

In operation, electrical cables 32 are connected to the outside of the outlet box 18 and are pulled through openings (not shown) in the rear of the outlet box 18. The cables 32 are then stripped to expose the ends of the wires 18, 21, 23. In applications such as those shown in FIG. 1, where common Romex type cables are utilized, the black wires 18 are then extended through the insulator band 14 and are connected to the terminals 24, 26 of the electrical connector 12 in the normal manner. The remaining wires 21, 23 are connected to one another and secured via wire nuts 20, 22, electrical tape or other art recognized insulating means. Once the wires 18, 21, 23 have been connected, the insulator band 14 is slid back over the wires 18, stretched over the sides 28 of the electrical connector 12, and positioned to cover the terminals 26 of the electrical connector 12. A side view of the insulator band 14 mounted in this position over the terminals 24, 26 of the electrical connector 12 is shown in FIG. 2. The electrical connector 12 is then positioned within the opening 30 in the outlet box 16 and secured via screws 34, clips, or other art recognized fastening means.

When the electrical connector 12 needs to be removed or replaced, it is removed from the opening 30 in the outlet box 16, the insulator band 14 is slipped back off the wires 18, and the wires are removed in the normal fashion. Once the new electrical connector 12 is installed, the same insulator band 14 may be reused by installing it in the same manner as described above.

Figure 3:
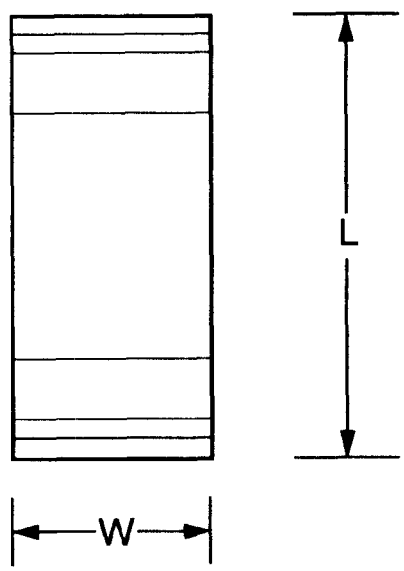
FIG. 3 is a side view of one embodiment of the insulator band of the present invention.
Figure 4:
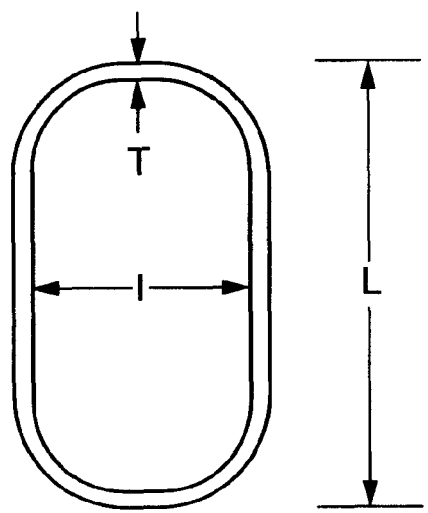
FIG. 4 is an end view of the insulator band of FIG. 3.

Referring now to FIGS. 3 and 4, the dimensions of the insulator band 14 are shown. The insulator band 14 has a length L, a band width W, an inside opening width I, and a thickness T. Each of these dimensions L, W, I, and T are varied dependent upon the particular application in which it will be utilized.

For example, a first application is where the electrical connector 12 around which the insulator band 14 is to be installed is a standard single light switch, and the insulator band 14 is made from natural rubber, such as the material from which bicycle inner tubes are manufactured. In such an application, the preferred length L will be approximately 1.875 inches, the preferred band width W will be approximately 0.625 inches, the preferred inside opening width I will be approximately 0.563 inches, and the preferred thickness T will be approximately 0.035 inches. By dimensioning the insulator band 14 in this manner, the insulator band 14 is allowed to cover the terminals 26, provide sufficient insulation from electrical shock, and provide sufficient elastic force upon the switch to maintain the insulator band 14 in place while avoiding springing or relaxation of the insulator band 14 due to the application of an excessive force.

A second application is where the electrical connector 12 around which the insulator band 14 is to be installed is a standard single plug electrical outlet, and the insulator band 14 is again made from natural rubber. In such an application, the preferred length T will be approximately 2.625 inches, the preferred band width W will be again approximately 0.675 inches, the preferred inside opening width I will be approximately 1.375 inches, and the preferred thickness T will again be approximately 0.035 inches. These dimensions are preferred for the same reasons as those set forth above with respect to the light switch.

In applications, such as applications in which 220 VAC power is utilized, the thickness T of the insulator band 14 may be increased to provide enhanced dielectric capacity. In these applications, the increased thickness will typically result in an insulator band 14 having less elasticity and, consequently, one that will exert a greater force at the same deflection. As this is the case, the remaining dimensions L, W, and L must closely match the dimensions of the electrical connector 12 to which the insulator band 14 will be mounted in order to maintain the force within a range that will maintain the insulator band 14 within position, while preventing springing or relaxation of the band over time.

Figure 5:
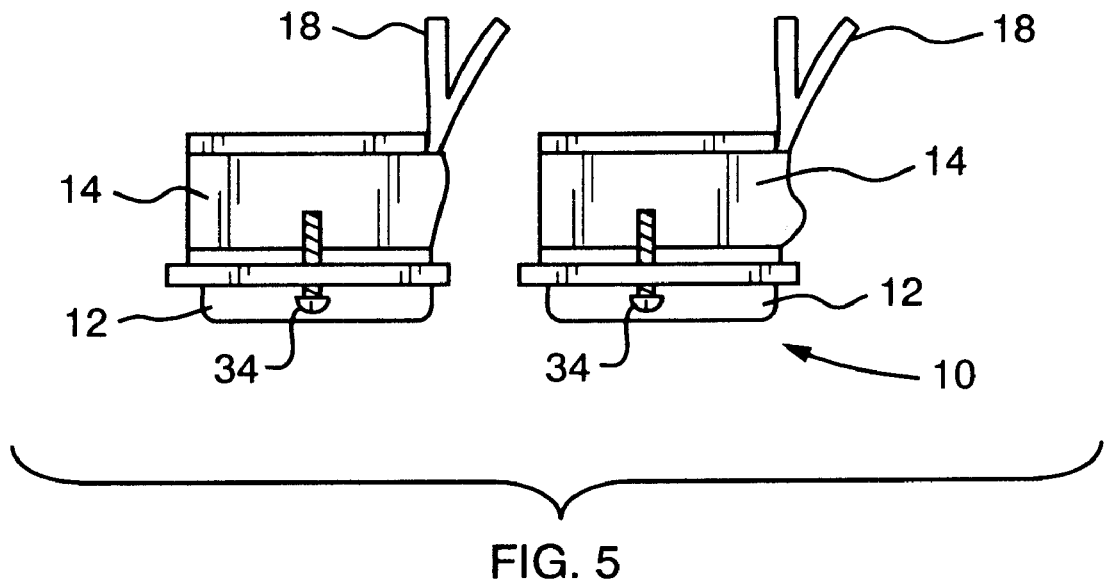
FIG. 5 is a top view of a pair of insulator bands of the present invention mounted around the plugs of a dual plug outlet.

Referring now to FIG. 5, one embodiment of the system 10 of the present invention, in which dual electrical connectors 12 are utilized, is shown. In many applications, a dual outlet box (not shown) will be utilized to house two electrical connectors 12. These electrical connectors 12 may be dual electrical outlet plugs, a single outlet plug and a switch, or a pair of switches. In these applications, a separate insulator band 14 is preferably mounted to each electrical connector 12 in same manner as described with reference to FIGS. 1 and 2 above.

Figure 6:
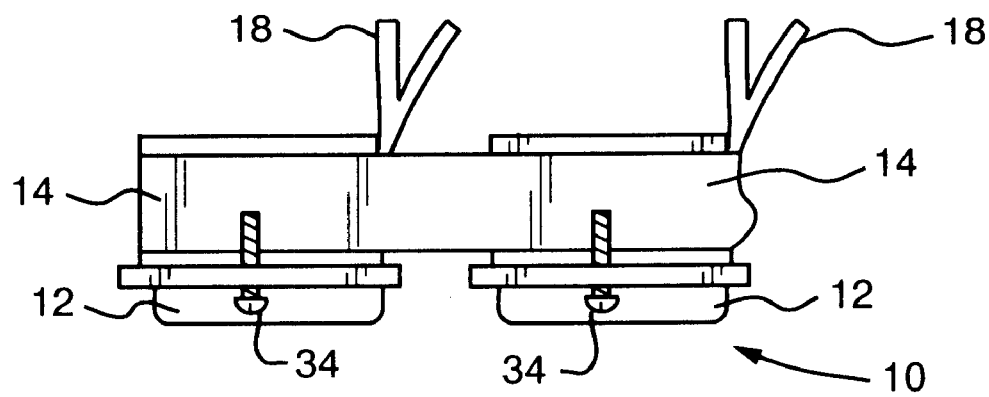
FIG. 6 is a top view of a single insulator band of the present invention mounted around the plugs of a dual plug outlet.

In some alternative embodiments, such as the embodiment of FIG. 6, a single insulator band 14 is utilized to cover two or more electrical connectors 12. In these embodiments, the insulator band 14 is dimensioned to surround the outside sides of the outer electrical connectors 12 such that the wires 18 and outer terminals, denoted by the bulge under the insulator band 14 at the outer right electrical connector 12, are prevented from shorting with the outlet box (not shown).

It is contemplated that the present invention will be sold in the form of a kit that will provide the components necessary for installation. In the basic embodiment of the kit, a single electrical connector 12 and insulator band 14 are provided. However, alternative embodiments of the kit may include wire nuts 20, 22, an outlet box 16, and mounting hardware, such as screws 34, for mounting the electrical connector 12 to the outlet box 16.

In other embodiments, the insulator band 14 will be sold separately, either individually, in multiples that are dimensioned for a specific type of electrical connector 12, or in a multiples that include insulator bands 14 dimensioned for mounting on a variety of different electrical connectors 12.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An article for insulating an electrical connector, said article comprising:
    a substantially elastic insulator band manufactured of an insulating material having a thickness insulating a user from an electrical current flowing through said electrical connector;
    wherein said insulator band has a width dimensioned to cover a terminal of said electrical connector; and
    wherein said insulator band has a length and an inside opening width, said length and inside opening width being dimensioned to provide an elastic force upon said electrical connector and maintains said band in position upon, and to prevent breakage and springing from, said electrical connector.

2. The article as claimed in claim 1 wherein said insulator band is manufactured of a rubber material.

3. The article as claimed in claim 2 wherein said electrical connector is an electrical switch having at least two terminals and wherein said width of said insulator band is dimensioned to cover each of said at least two terminals.

4. The article as claimed in claim 3 wherein said width is between about 0.50 inches and about 0.75 inches.

5. The article as claimed in claim 4 wherein said length is between about 1.75 inches and about 2.0 inches and wherein said inside opening width is between about 0.5 inches and about 0.75 inches.

6. The article as claimed in claim 2 wherein said electrical connector is an electrical outlet having at least two terminals and wherein said width of said insulator band is dimensioned to cover each of said at least two terminals.

7. The article as claimed in claim 6 wherein said width is between about 0.50 inches and about 0.75 inches.

8. The article as claimed in claim 7 wherein said length is between about 2.5 inches and about 2.75 inches and wherein said inside opening width is between about 1.25 inches and about 1.5 inches.

9. A kit of parts for making an electrical connection, said kit of parts comprising:
    an electrical connector having at least one terminal; and
    a substantially elastic insulator band manufactured of an insulating material having a thickness insulating a user from an electrical current flowing through said electrical connector;
    wherein said insulator band has a width dimensioned to cover a terminal of said electrical connector; and
    wherein said insulator band has a length and an inside opening width, said length and inside opening width being dimensioned to provide an elastic force upon said electrical connector and maintains said band in position upon, and to prevent breakage and springing from, said electrical connector.

10. The kit of parts as claimed in claim 9 wherein said insulator band is manufactured of a rubber material.

11. The kit of parts as claimed in claim 10 wherein said electrical connector is an electrical switch having at least two terminals.

12. The kit of parts as claimed in claim 10 wherein said electrical connector is a single light switch having at least two terminals, wherein said width of said insulator band is between about 0.50 inches and about 0.75 inches, wherein said length of said insulator band is between about 1.75 inches and about 2.0 inches, and wherein said inside opening width of said insulator band is between about 0.5 inches and about 0.75 inches.

13. The kit of parts as claimed in claim 10 wherein said electrical connector is a single plug outlet having at least two terminals, wherein said width of said insulator band is between about 0.50 inches and about 0.75 inches, wherein said length of said insulator band is between about 2.5 inches and about 2.75 inches, and wherein said inside opening width of said insulator band is between about 1.25 inches and about 1.5 inches.

14. An electrical system comprising:
    at least one electrical connector having at least one terminal;
    at least one wire attached to said at least one terminal of said at least one electrical connector; and
    a substantially elastic insulator band manufactured of an insulating material having a thickness insulating a user from an electrical current flowing through said electrical connector;
    wherein said insulator band is disposed about said electrical connector such that a width of said insulator band covers said at least one terminal of said electrical connector and said at least one wire; and
    wherein said insulator band is dimensioned to exert an elastic force upon said electrical connector and maintains said band in position upon, and to prevent breakage and springing from, said electrical connector.

15. The electrical system as claimed in claim 14 wherein said at least one electrical connector is at least two electrical connectors and wherein said at least one insulator band is at least two insulator bands, wherein one of said at least two insulator bands is disposed about one of said at least two electrical connectors and wherein another of said at least two insulator bands is disposed about another of said at least two electrical connectors.

16. The electrical system as claimed in claim 15 wherein said at least two connectors are single light switches having at least two terminals, and wherein a width each of said insulator bands is between about 0.50 inches and about 0.75 inches, wherein a length of each of said insulator bands is between about 1.75 inches and about 2.0 inches, and wherein an inside opening width of each of said insulator bands is between about 0.5 inches and about 0.75 inches.

17. The electrical system as claimed in claim 14 wherein said at least one electrical connector is at least two electrical connectors and wherein said insulator band is disposed about each of said at least two electrical connectors.

18. The electrical system as claimed in claim 14 wherein said insulator band is manufactured of a rubber material.

* * * * *